(12) United States Patent
Takahashi et al.

(10) Patent No.: US 8,582,142 B2
(45) Date of Patent: Nov. 12, 2013

(54) IMAGE PROCESSING SYSTEM

(75) Inventors: Kenichi Takahashi, Sennan-gun (JP); Masahiro Kitamura, Osaka (JP); Mitsuzo Iwaki, Osaka (JP); Daisuke Sakiyama, Kawanishi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 923 days.

(21) Appl. No.: 12/055,476

(22) Filed: Mar. 26, 2008

(65) Prior Publication Data
US 2008/0291489 A1 Nov. 27, 2008

(30) Foreign Application Priority Data

May 24, 2007 (JP) .................. 2007-137952

(51) Int. Cl.
G06F 3/12 (2006.01)
(52) U.S. Cl.
USPC ......... 358/1.15; 358/1.13; 358/401; 358/402; 358/403
(58) Field of Classification Search
USPC ............ 358/1.15, 1.13, 1.14, 1.16, 401, 402, 358/403
See application file for complete search history.

(56) References Cited

U.S. PATENT DOCUMENTS

| 2007/0064269 A1* | 3/2007 | Mokuya et al. | 358/1.15 |
| 2007/0081186 A1* | 4/2007 | Numata | 358/1.15 |
| 2007/0146778 A1* | 6/2007 | Kitagata et al. | 358/1.15 |
| 2008/0225326 A1* | 9/2008 | Kephart et al. | 358/1.15 |

FOREIGN PATENT DOCUMENTS

| JP | 2001-216116 A | 8/2001 |
| JP | 2002-244836 A | 8/2002 |
| JP | 2004-249625 | 9/2004 |
| JP | 2004/249625 | 9/2004 |
| JP | 2005-100261 A | 4/2005 |
| JP | 2005-346284 | 12/2005 |
| JP | 2006-031179 | 2/2006 |
| JP | 2006-209196 | 8/2006 |
| JP | 2007-034493 | 2/2007 |

OTHER PUBLICATIONS

Notification of Reasons for Refusal in JP 2007-137952 dated Apr. 21, 2009, and an English Translation thereof.

* cited by examiner

Primary Examiner — Vu B Hang
(74) Attorney, Agent, or Firm — Buchanan Ingersoll & Rooney PC

(57) ABSTRACT

After a print request is made from a personal computer to a multifunction peripheral, when a user who logs into the multifunction peripheral instructs an execution of the print request in the multifunction peripheral, the multifunction peripheral requests the personal computer to transmit image data. Then, the personal computer transmits the requested image data to the multifunction peripheral. The multifunction peripheral executes the printing using the received image data. When the printing is completed, the multifunction peripheral transmits a completion notification indicating that the printing is completed to the personal computer. When receiving the completion notification, the personal computer transmits a completion notification having the same content as the received completion notification to the multifunction peripheral.

15 Claims, 12 Drawing Sheets

FIG. 4
COMMUNICATION DATA STRUCTURE
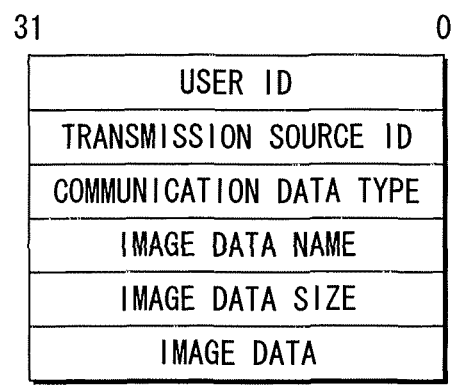
COMMUNICATION DATA TYPE
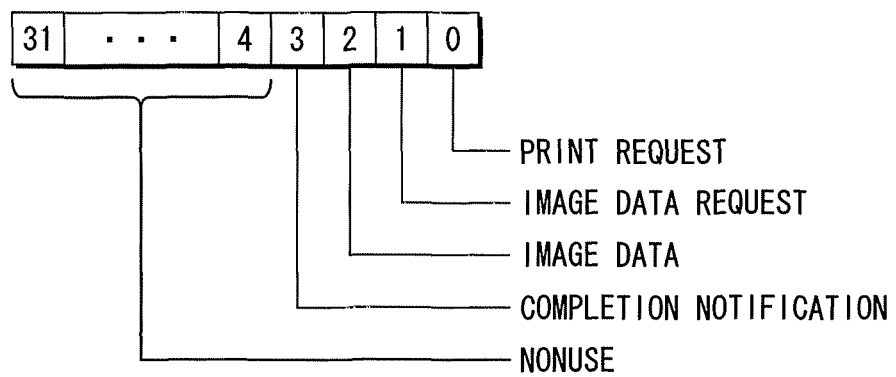

FIG. 7

FIG. 9
COMMUNICATION DATA STRUCTURE
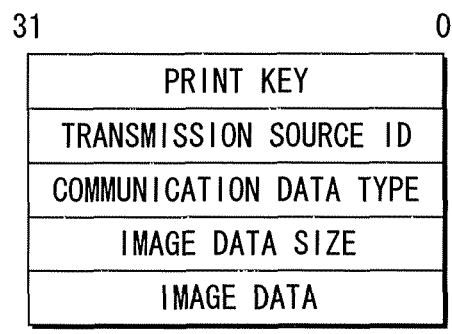
COMMUNICATION DATA TYPE
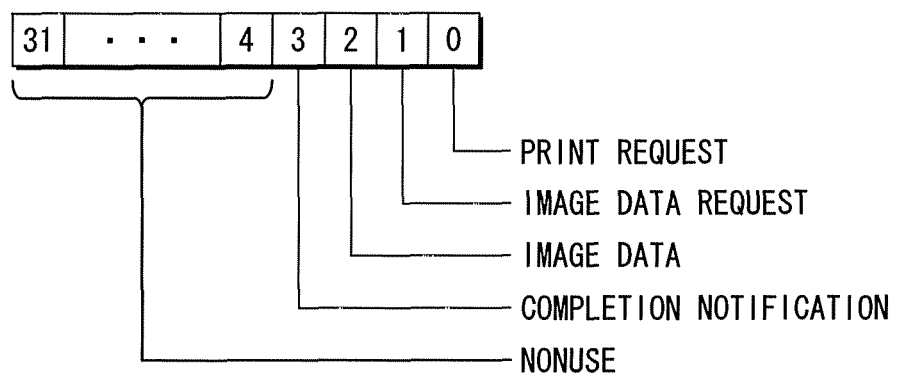

IMAGE PROCESSING SYSTEM

CROSS REFERENCE TO RELATED APPLICATIONS

This application is based on application No. 2007-137952 filed in Japan, the contents of which are hereby incorporated by reference.

BACKGROUND OF THE INVENTION (1) Field of the Invention

The present invention relates to an image processing system, and especially to an image processing system that can achieve a good balance between security protection and a user's convenience in a case of pull print.

(2) Related Art

In recent years, a network printer has been widely used, and the following method of using the network printer has become common. In an office environment, a plurality of multifunction peripherals (MFP) are connected to a network in order to print document data and the like that is made by and transmitted from a personal computer (PC). In this case, if a user tries to print a document in an unfamiliar office environment such as a business trip destination, the user's convenience is reduced because it is difficult to judge to which of a plurality of multifunction peripherals should the user transmit document data of the document.

Therefore, the following image forming system is proposed. After each of a plurality of multifunction peripherals receives document data via a printer server, only a multifunction peripheral that receives an instruction of a print execution directly from a user can print a document of the document data. When any of the plurality of multifunction peripherals receives the instruction of the print execution, the other multifunction peripherals delete the received document data. This construction can avoid the following unexpected situations. If the user cannot recognize which multifunction peripheral executed printing, a printed matter may be lost, or if a third party finds the printed matter, information of the printed matter may be leaked. The following references disclose the above-mentioned construction.

Japanese Published Patent Application No. 2002-244836
Japanese Published Patent Application No. 2005-100261
Japanese Published Patent Application No. 2001-216116

However, if document data is transmitted to each of a plurality of multifunction peripherals, it could cause a leak of information especially when a user prints a document in an unfamiliar office environment.

Also, when a user instructs any of a plurality of multifunction peripherals to execute printing, if the printing fails because of a failure of the multifunction peripheral, the user has to request the printing in a personal computer again. Therefore, this is unsuitable for the user's convenience.

SUMMARY OF THE INVENTION

In view of the above problem, an object of the present invention is to provide an image processing system that can prevent a leak of information associated with a print execution, and achieve a high user's convenience.

The above object is fulfilled by an image processing system including a terminal that makes a request to process image data, and one or more image processing devices that process the image data in accordance with the request to process the image data from the terminal, the terminal comprising: a holder that holds the image data; a process instruction receiver operable to receive, from a user, an instruction to process the image data held by the holder; a process requestor operable to transmit, to each of the one or more image processing devices, the request to process the image data, which includes user specification information and image data specification information, the user specification information specifying the user that transmitted the instruction to process the image data, and the image data specification information specifying the image data relating to the instruction to process the image data; and an image data transmitter operable to, when a request to transmit the image data, which includes the image data specification information, is received from one of the one or more image processing devices, transmit the image data to the image processing device, and each of the one or more image processing devices comprising: a receiver operable to receive the request to process the image data from the terminal; an authenticator operable to authenticate a user of the image processing device; an execution instruction receiver operable to, when the user authenticated by the authenticator is identical to the user specified by the user specification information relating to the request to process the image data, receive an instruction to execute the request to process the image data; an image data requester operable to, when the execution instruction receiver receives the instruction to execute the request to process the image data, make the request to transmit the image data to the terminal; and an image processor operable to receive, from the terminal, the image data requested by the image data requester to perform image processing on the image data.

With the above-stated construction, the image data is not transmitted to the image processing device until the user instructs the execution of the image process. Therefore, it can reduce a possibility that confidentiality is leaked because of a case in which the image data is unnecessarily transmitted to a number of image processing devices.

Also, the user can execute the image process only by selecting and instructing a proper image processing device. Therefore, the user can obtain a high convenience.

Moreover, the terminal has transmitted only the process request to the image processing device in advance. Therefore, a communication load of the terminal itself and the network can be dramatically reduced, compared with a conventional technology in which the image data itself has been transmitted in advance.

In the image processing system of the present invention, each of the one or more image processing devices further comprises: a displaying part operable to display, to the user authenticated by the authenticator, a list of one or more requests to process the image data, which include the user specification information that specifies the user, wherein the image processing device receives, from the user, a selection of any of the one or more requests to execute the selected request. With the above-stated construction, a specification of the process request to be instructed the execution can be eased. Therefore, a user's convenience can be improved.

In the image processing system of the present invention, each of the one or more image processing devices further comprises: a completion notifier operable to, when the image processing by the image processor is completed, transmit a completion notification to the terminal, the completion notification specifying the request to process the image data; and a deleting part operable to, when the completion notification is received from the terminal, delete the request to process the image data specified by the completion notification, and the terminal further comprises: a transferring part operable to, when the completion notification is received from any of the one or more image processing devices, transfer the completion notification to the other image processing devices.

The above-stated construction can prevent a confidentiality leak and a waste of the storage area in the image processing device because of a case in which the print request that has been executed in any of the image processing devices remains in the other image processing devices.

In the image processing system of the present invention, the image processing is any of print, transfer, Box storage, and server upload. In any case, the effect of the present invention can be obtained.

BRIEF DESCRIPTION OF THE DRAWINGS

These and other objects, advantages and features of the invention will become apparent from the following description thereof taken in conjunction with the accompanying drawings those illustrate a specific embodiments of the invention.

In the drawings:

FIG. 4 shows a communication data structure that is used in the communication sequence shown in FIG. 3;

FIG. 7 shows a display screen of a printer driver that is installed in the personal computer 103;

FIG. 9 shows a communication data structure of a second embodiment of the present invention;

DESCRIPTION OF THE PREFERRED EMBODIMENTS

The following describes embodiments of an image processing system of the present invention by taking an image forming system as an example, with reference to the attached drawings.

[1] First Embodiment

The following describes a first embodiment of the present invention.

(1) Structure of Image Forming System

Figure 1:
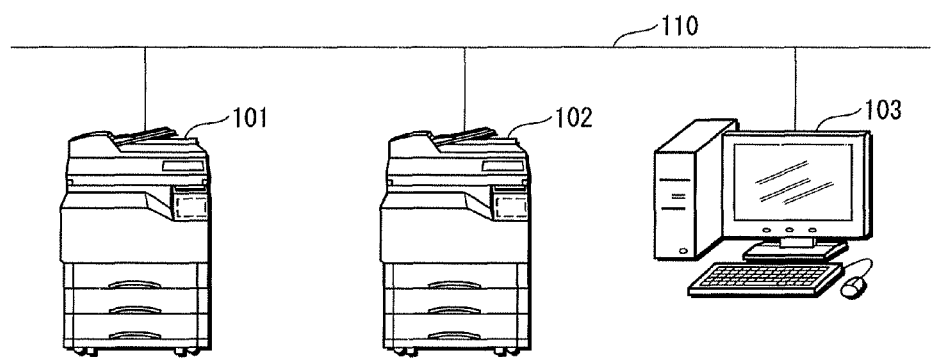
FIG. 1 shows a main structure of an image forming system of a first embodiment of the present invention.

Firstly, a structure of an image forming system will be described. FIG. 1 shows a main structure of the image forming system. As shown in FIG. 1, in an image forming system 1, multifunction peripherals 101 and 102, and a personal computer 103 are connected to each other via, a LAN (local area network) 110. The multifunction peripherals 101 and 102, and the personal computer 103 perform IP (internet protocol) communication with each other via the LAN 110.

(2) Structures of Multifunction Peripherals 101 and 102

Next, a structure of the multifunction peripheral 101 will be described. Because the multifunction peripheral 102 has the same structure as the multifunction peripheral 101, the explanation of the multifunction peripheral 101 is applied to the multifunction peripheral 102.

Figure 2:
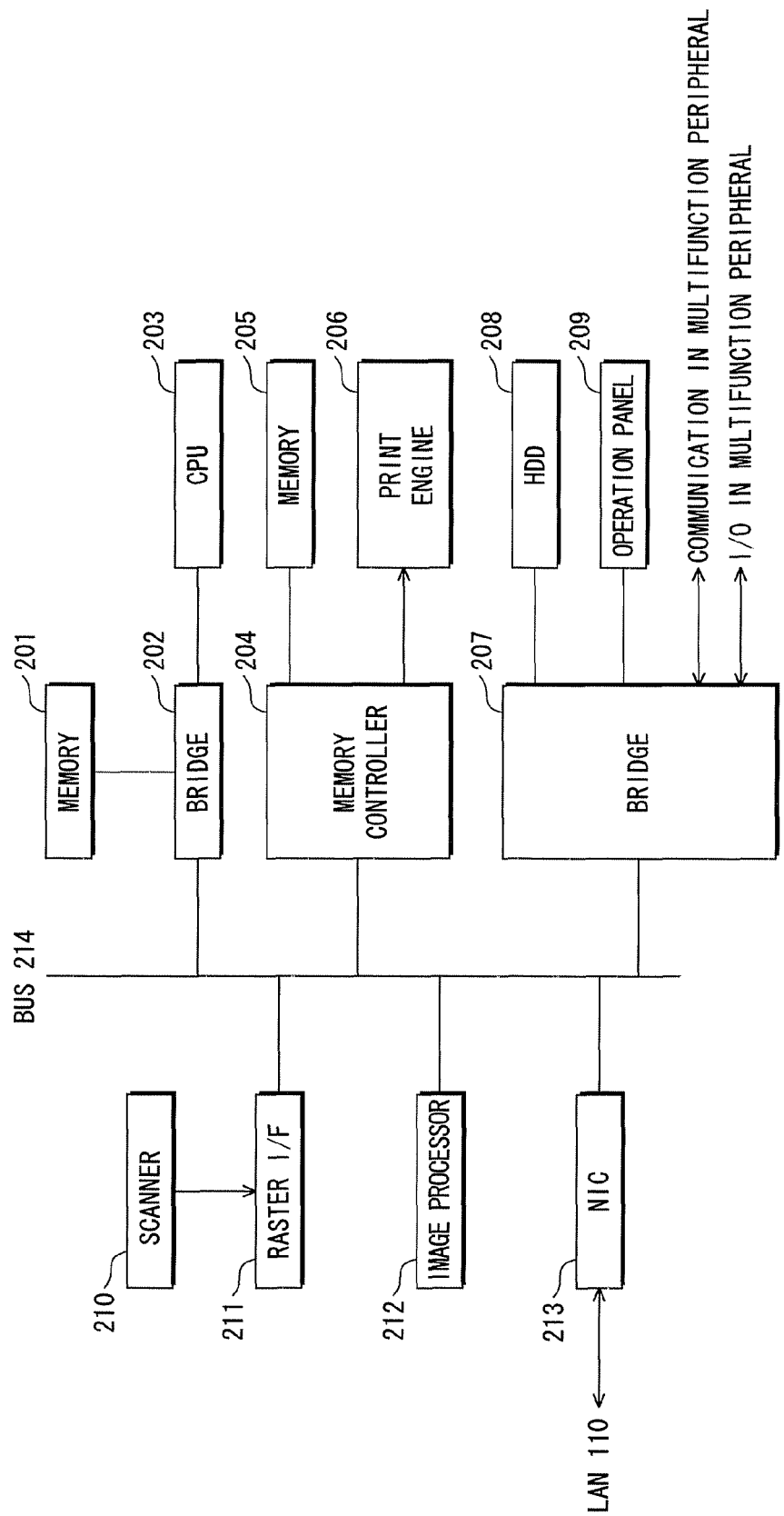
FIG. 2 is a block diagram showing a main structure of a multifunction peripheral 101.

FIG. 2 is a block diagram showing a main structure of the multifunction peripheral 101. As shown in FIG. 2, the multifunction peripheral 101 includes a CPU (central processing unit) 203, memories 201 and 205, bridges 202 and 207, a memory controller 204, a print engine 206, a HDD (hard disk drive) 208, an operation panel 209, a scanner 210, a raster interface 211, an image processor 212, a NIC (network interface card) 213, and a bus 214.

The bridges 202 and 207, the memory controller 204, the raster interface 211, the image processor 212, and the NIC 213 are connected to the bus 214. The CPU 203 and the memory 201 are connected to the bus 214 via the bridge 202. The memory 205 and the print engine 206 are connected to the bus 214 via the memory controller 204. The HDD 208 and the operation panel 209 are connected to the bus 214 via the bridge 207.

The NIC 213 performs communication with the multifunction peripheral 102 and the personal computer 103 via the LAN 110 to receive a print request and image data. The received image data is written to the memory 205 via the bus 214 and the memory controller 204.

The image processor 212 reads out the image data from the memory 205 to perform an image process on the image data. Then, the image processor 212 writes the processed image data to the memory 205 again. The processed image data is transferred to the print engine 206 via the memory controller 204 to be used for an image formation.

Image data that is read out by the scanner 210 is written to the memory 205 via the raster interface 211 and the like, and an image process is performed on the image data by the image processor 212. Then, the image data is used for an image formation in the print engine 206.

The HDD 208 stores what is called Box data. The operation panel 209 receives an input from a user, and performs a display operation to the user.

(3) Communication Sequence

Figure 3:
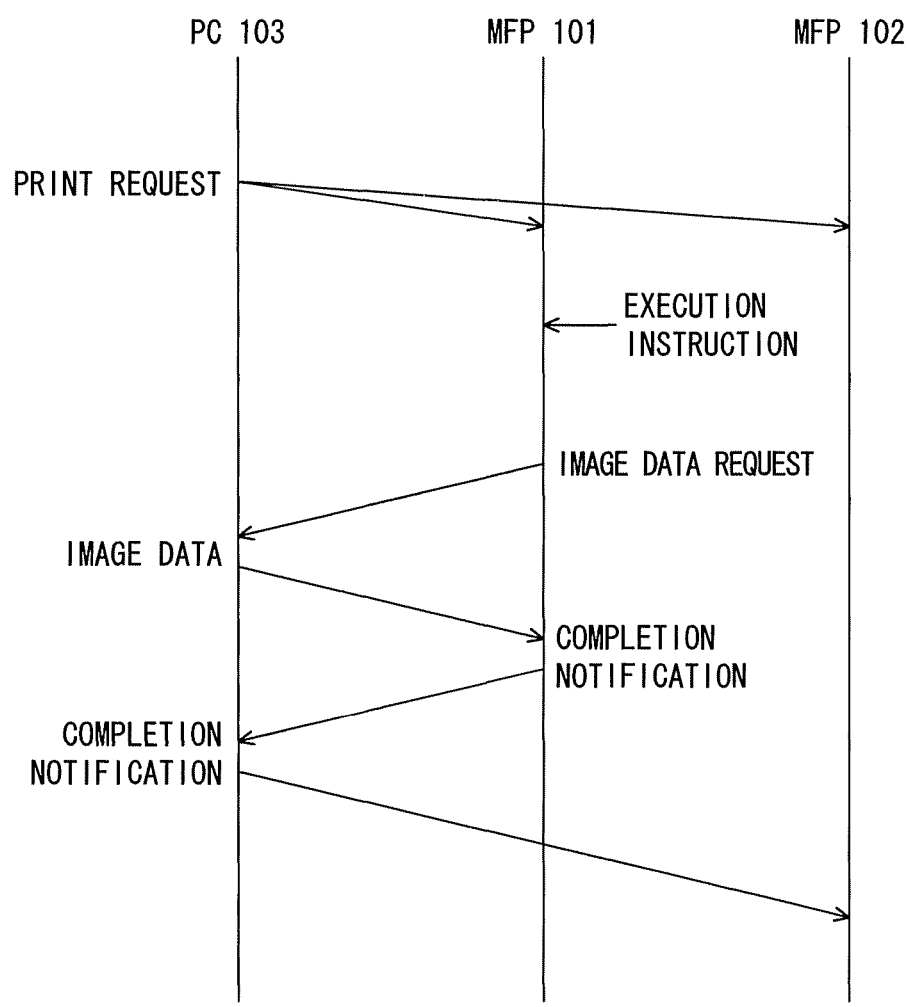
FIG. 3 is a communication sequence in an image forming system 1.

Then, a communication sequence among the multifunction peripherals 101 and 102, and the personal computer 103 will be described. FIG. 3 is the communication sequence in the image forming system 1. As shown in FIG. 3, firstly, the personal computer 103 makes a print request to the multifunction peripherals 101 and 102.

This print request can be made by "UDP (user datagram protocol) broadcast", or can be sequentially and individually transmitted to the multifunction peripherals 101 and 102 using a TCP (transmission control protocol). After that, when a user who succeeds in being authenticated in the multifunction peripheral 101 to log into the multifunction peripheral 101 instructs an execution of the print request, the multifunction peripheral 101 requests the personal computer 103 to transmit image data relating to the print request.

When receiving the request of the image data from the multifunction peripheral 101, the personal computer 103 transmits the requested image data to the multifunction peripheral 101. When receiving the image data from the personal computer 103, the multifunction peripheral 101 executes printing using the image data.

When completing the printing of the image data, the multifunction peripheral 101 transmits a completion notification indicating that the printing of the image data is completed to the personal computer 103. When receiving the completion notification, the personal computer 103 transmits a completion notification having the same content as the received completion notification to the multifunction peripheral 102.

(4) Communication Data Structure

Next, a data structure of communication data in the above-mentioned communication sequence will be described. FIG. 4 shows the communication data structure that is used in the communication sequence. As shown in FIG. 4, the communication data structure of the first embodiment includes each of the following fields: a user ID; a transmission source ID; a communication data type; an image data name; an image data size; and image data.

In the user ID field, IDs for identifying a user who makes a print request from a personal computer, and a user who instructs an execution of a print request in a multifunction peripheral are stored.

In the transmission source ID field, IDs for identifying a multifunction peripheral and a personal computer that transmit the communication data are stored. The multifunction peripheral specifies a personal computer to request the image data with reference to the transmission source ID field, and the personal computer specifies a multifunction peripheral to transmit the image data with reference to the transmission source ID field.

In the communication data type field, a type of the communication data is displayed. When a zeroth bit of the communication data type is set, the communication data is a print request. When a first bit is set, the communication data is an image data request, and when a second bit is set, the communication data is image data. When a third bit is set, the communication data is a completion notification.

From a fourth bit to a thirty-first bit are ignored. If a plurality of bits from the zeroth bit to the third bit are set, or if no bit is set, it is judged to be an error, and the communication data is discarded.

In the image data name field, an image data name for specifying the image data relating to the print request is stored. When requesting the image data, the multifunction peripheral notifies the image data name relating to the print request that is received from the personal computer. As a result, the multifunction peripheral can obtain the proper image data.

In the image data size field, only when the image data bit (the second bit) is set in the communication data type field, a size in bytes of the image data stored in the image data field that follows the image data size field is stored. In the image data field, the image data of the size indicated in the image data size field is stored.

(5) Operation of Personal Computer 103

Next, an operation of the personal computer 103, such as an operation executed by a printer driver that is installed in the personal computer 103 will be described.

Figure 5:
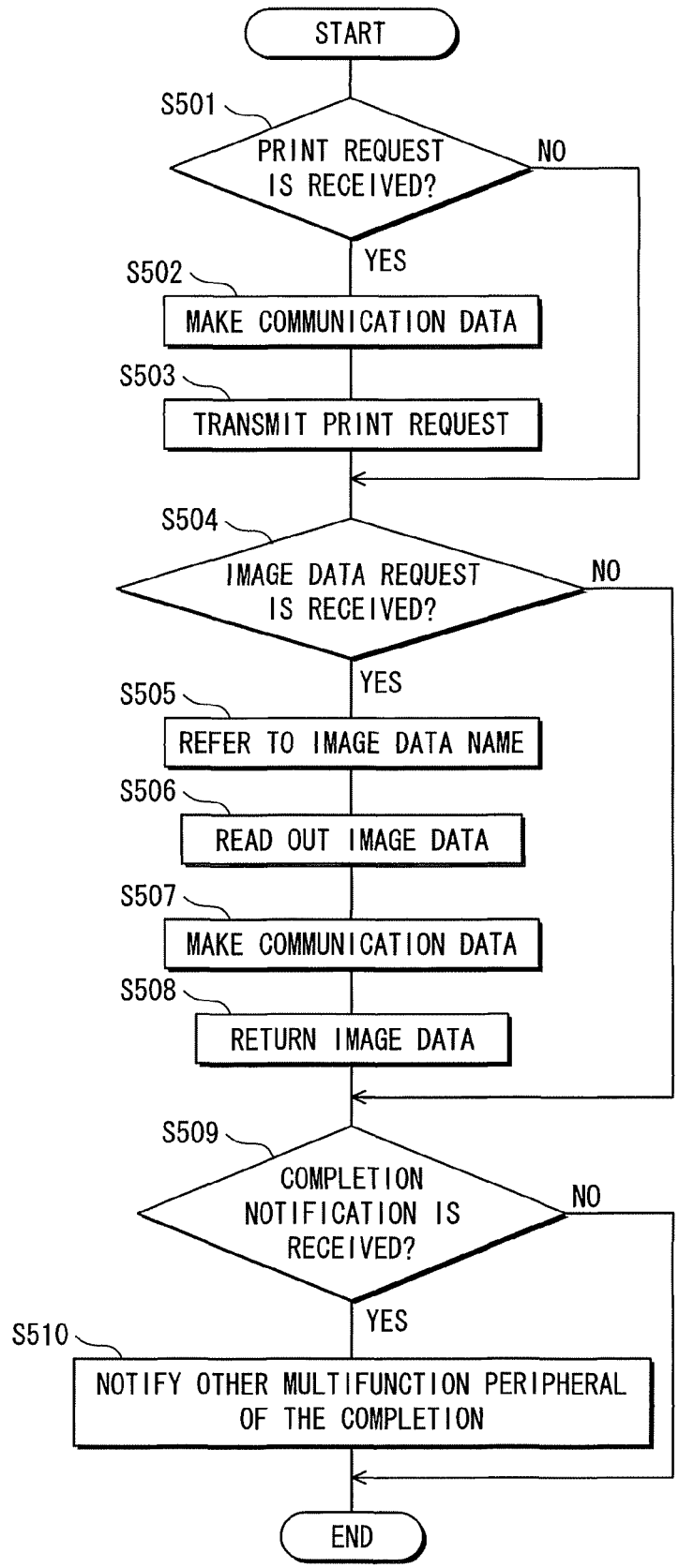
FIG. 5 is a flowchart showing an operation of a personal computer 103.

FIG. 5 is a flowchart showing the operation of the personal computer 103. As shown in FIG. 5, when receiving a print request from a user ("YES" in S501), the personal computer 103 makes communication data to transmit the print request to the multifunction peripherals 101 and 102 (S502).

In detail, the personal computer 103 makes the communication data having fields in which a user ID of the user who requests the printing, a, transmission source ID of the personal computer 103, a value (0x01) in which only the print request bit is set as a communication data type, and an image data name that is requested to be printed are stored. Then, the personal computer 103 transmits the communication data to the multifunction peripherals 101 and 102 (S503).

Also, when receiving an image data request from any of the multifunction peripherals 101 and 102 ("YES" in S504), the personal computer 103 refers to the image data name that is stored in the communication data of the image data request (S505), and reads out the image data having the image data name (S506). Then, the personal computer 103 makes communication data including the image data (S507), and returns the image data to the multifunction peripheral that is the request source (S508).

Also, when receiving a completion notification indicating that the printing of the image data is completed, from any of the multifunction peripherals 101 and 102 ("YES" in S509), the personal computer 103 transmits a completion notification having the same content as the received completion notification to the other multifunction peripheral (S510).

(6) Operations of Multifunction Peripherals 101 and 102

Then, an operation of the multifunction peripheral 101 will be described. Because the multifunction peripheral 102 has the same operation as the multifunction peripheral 101, the explanation of the multifunction peripheral 101 is applied to the multifunction peripheral 102.

Figure 6:
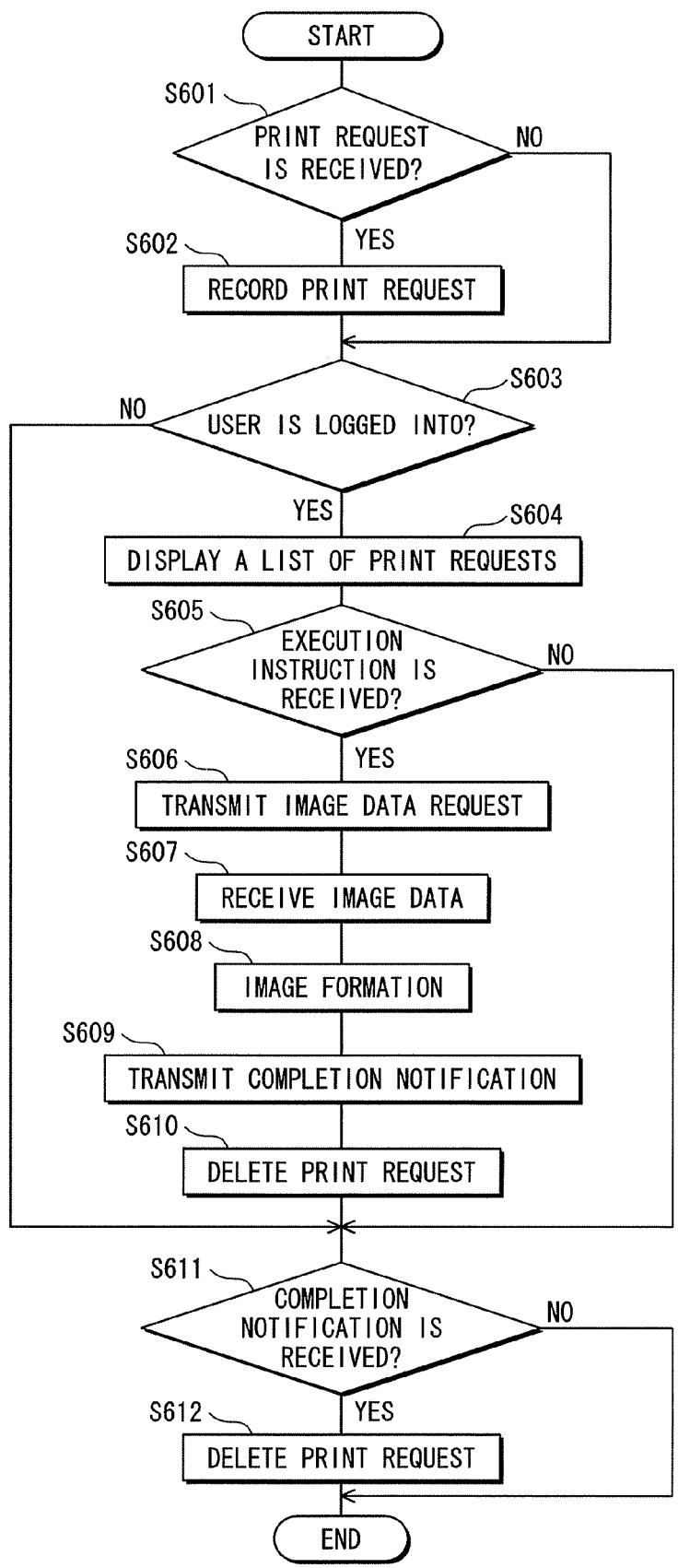
FIG. 6 is a flowchart showing an operation of the multifunction peripheral 101.

FIG. 6 is a flowchart showing the operation of the multifunction peripheral 101. As shown in FIG. 6, when receiving one or more print requests from the personal computer 103 ("YES" in S601), the multifunction peripheral 101 records the print requests in the HDD 208 (S602).

When receiving login from a user ("YES" in S603), the multifunction peripheral 101 displays a list of the print requests that are recorded in the HDD 208, and also the print requests relating to the user of the login, in the operation panel 209 (S604).

When the user selects any of the print requests displayed in the list, and instructs an execution of the print request ("YES" in S605), the multifunction peripheral 101 requests the personal computer 103 to transmit image data relating to the print instruction (S606). When receiving the image data from the personal computer 103 in response to the image data request (S607), the multifunction peripheral 101 executes an image formation using the image data (S608).

When completing the image formation, the multifunction peripheral 101 refers to a transmission source ID of the print request to transmit a completion notification to the personal computer 103 that is the transmission source (S609). Then, the multifunction peripheral 101 deletes the print request from the HDD 208 (S610).

When receiving the completion notification from the personal computer 103 ("YES" in S611), the multifunction peripheral 101 deletes the print request relating to the completion notification from the HDD 208 (S612).

(7) User Interface

Next, a user interface of the personal computer 103 will be described.

Figure 7:
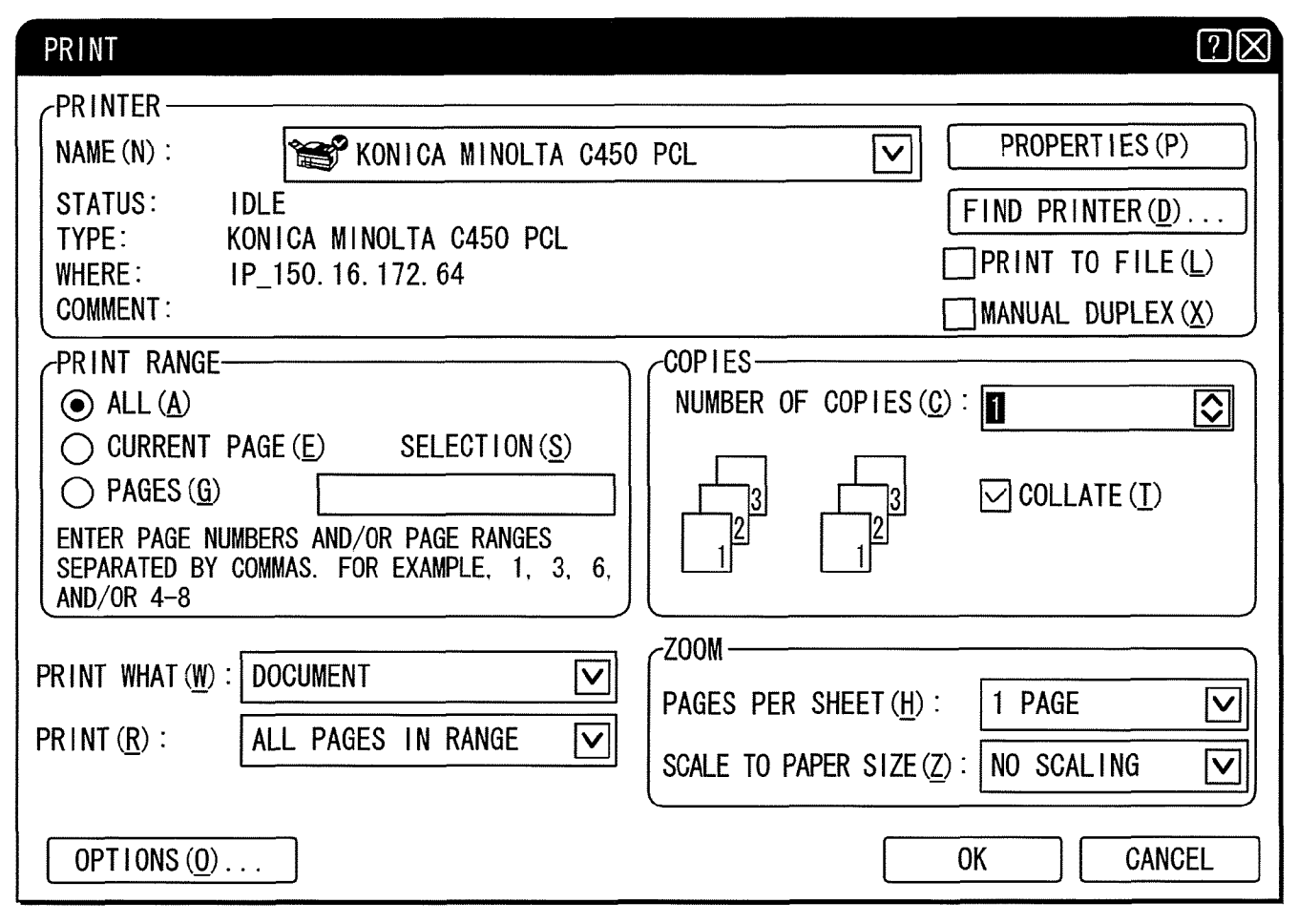

FIG. 7 shows a display screen of a printer driver that is installed in the personal computer 103. As shown in FIG. 7, in a display screen 7, a "printer" area, a "print range" area, a "copies" area, a column of "print what", a column of "print", an "zoom" area, and various buttons are displayed. When specifying any of the multifunction peripherals to make a print request, the multifunction peripheral is specified in a column of "Name (N)" in the "printer" area.

Figure 8:
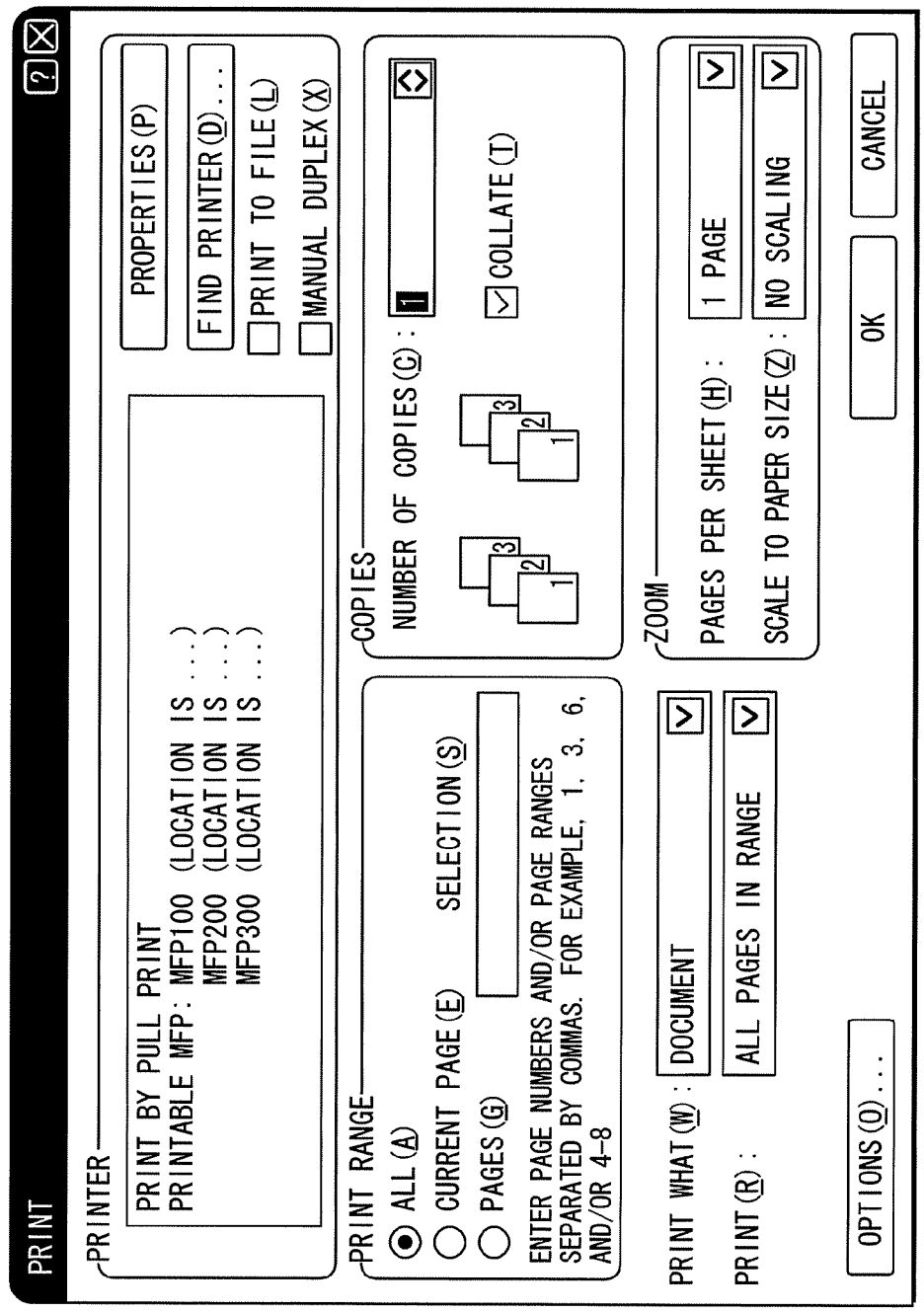
FIG. 8 shows a display screen of a printer driver when pull print is selected.

When pull print is executed without specifying the multifunction peripheral, pull print is selected. FIG. 8 shows a display screen of a printer driver when pull print is selected. As shown in FIG. 8, in a "printer" area in a display screen 8, it is displayed that the printing is executed by pull print, and a list of the multifunction peripherals that are capable of printing is also displayed. Note that in addition to names of the multifunction peripherals, locations of the multifunction peripherals are also displayed in the list. Therefore, a user can select a proper multifunction peripheral, such as a multifunction peripheral that is located closest to the user.

[2] Second Embodiment

The following describes a second embodiment of the present invention. An image forming system of the second embodiment has a similar construction to the image forming system of the first embodiment, but differs in a security measure associated with an image formation. This difference will be mainly described below.

(1) Communication Data Structure

Firstly, a data structure of communication data of the second embodiment will be described. FIG. 9 shows the communication data structure of the second embodiment. As shown in FIG. 9, the communication data structure of the second embodiment includes a field of a print key instead of the two fields of the user ID and the image data name.

The print key is a five-digit number that is generated by a printer driver to display when a user makes a print request in a personal computer.

Because the other fields are same as in the first embodiment, the explanations thereof are omitted.

(2) Operation of Personal Computer

Next, an operation of a personal computer will be described.

Figure 10:
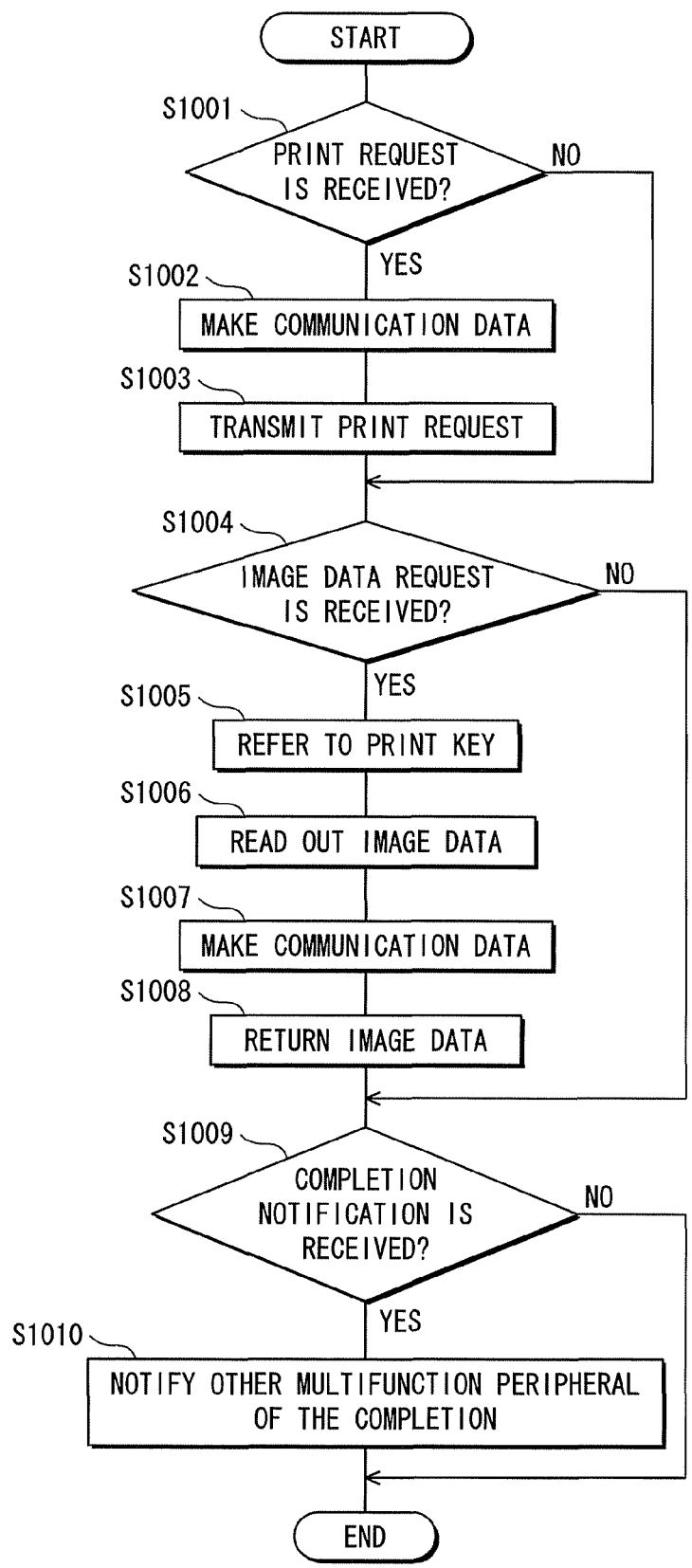
FIG. 10 is a flowchart showing an operation of a personal computer.

FIG. 10 is a flowchart showing the operation of the personal computer. As shown in FIG. 10, when receiving a print request from a user ("YES" in S1001), the personal computer makes communication data to transmit the print request to the multifunction peripheral (S1002).

Figure 11:
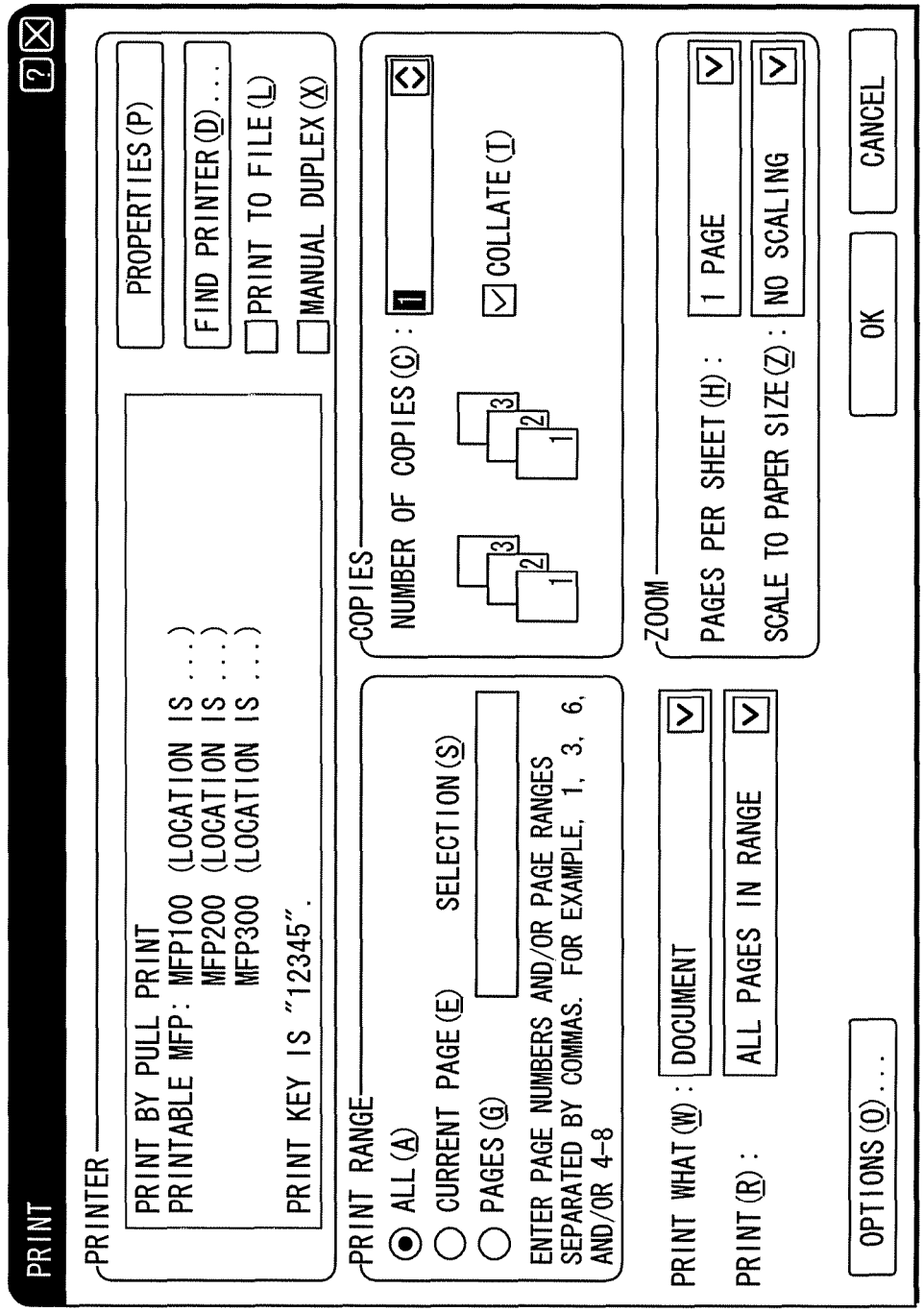
FIG. 11 shows a display screen of a printer driver.

In the second embodiment, the personal computer generates a print key in a printer driver and displays the print key when a user makes a print request. FIG. 11 shows a display screen of the printer driver. As shown in FIG. 11, when a user makes a print request, in a "printer" area in a printer driver, it is displayed that the printing is executed by pull print, and a list of the multifunction peripherals that are capable of printing is displayed. In addition, a five-digit number as a print key is also displayed. As this five-digit number, a pseudo-random number can be used, for example.

The print key is stored in the communication data, and a print request is transmitted (S1003). Also, the personal computer associates the print key with location information of image data relating to the print request to store them.

When receiving the image data request from the multifunction peripheral ("YES" in S1004), the personal computer refers to the print key in the communication data (S1005). Then, the personal computer refers to the location information of the image data associated with the print key, reads out the image data (S1006), makes the communication data (S1007), and returns the image data (S1008).

With this construction, only the print key is transmitted to the multifunction peripheral when making the print request, and the image data name is not transmitted. Therefore, a leak of information caused by someone who looks into the image data name can be prevented.

(3) Operation of Multifunction Peripheral

Next, an operation of the multifunction peripheral will be described.

Figure 12:
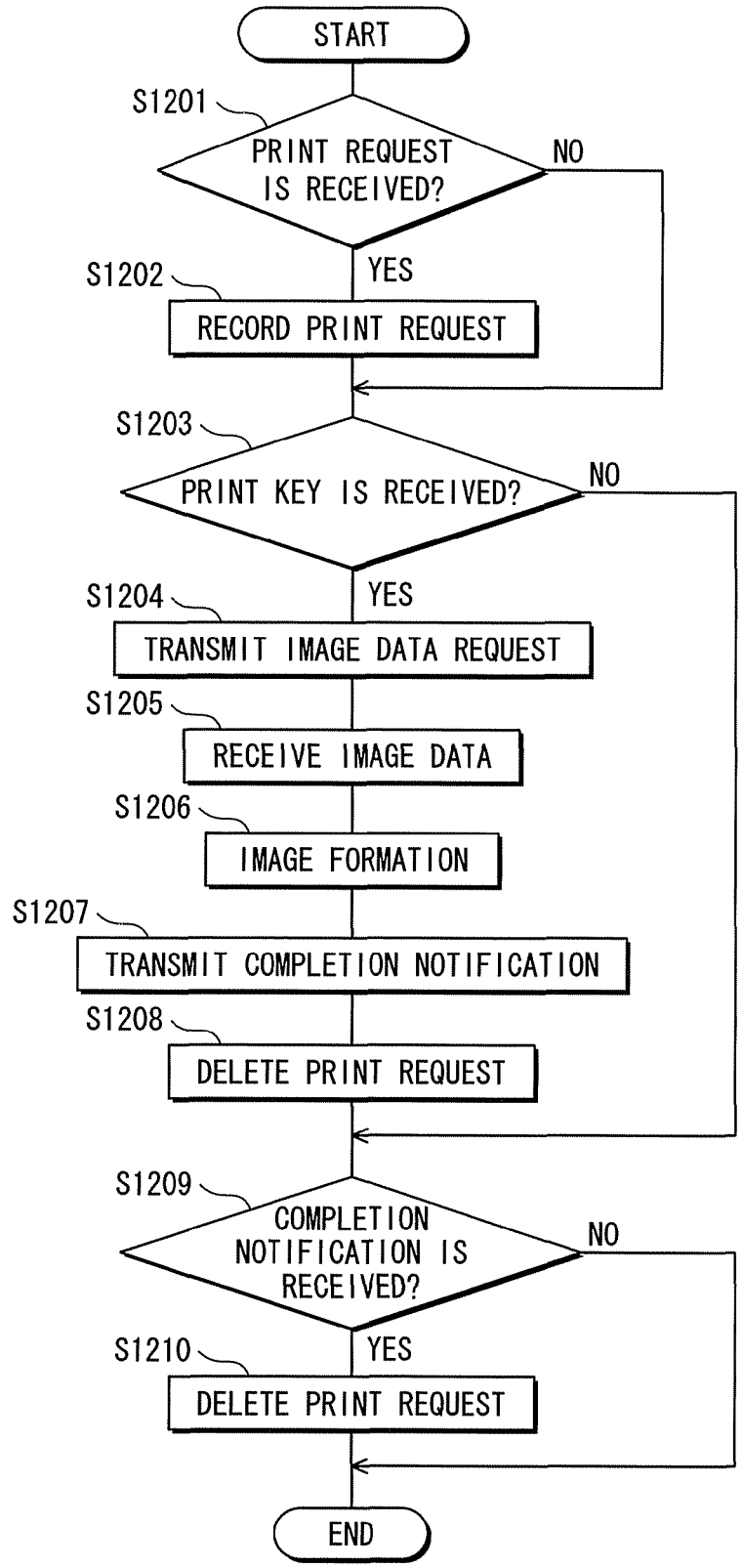
FIG. 12 is a flowchart showing an operation of a multifunction peripheral.

FIG. 12 is a flowchart showing the operation of the multifunction peripheral. As shown in FIG. 12, when receiving a print request from the personal computer ("YES" in S1201), the multifunction peripheral records the print request (S1202). In the print request, the print key is included.

When receiving an input of the print key from a user ("YES" in 1203), the multifunction peripheral refers to the print request relating to the print key to specify a transmission source of the print request, and requests the transmission source to transmit the image data (S1204). When receiving the image data from the personal computer in response to the image data request (S1205), the multifunction peripheral executes an image formation using the image data (S1206).

When completing the image formation, the multifunction peripheral transmits a completion notification to the personal computer (S1207), and deletes the print request (S1208).

When receiving the completion notification ("YES" in S1209), the multifunction peripheral deletes the print request relating to the completion notification (S1210).

With this construction, the execution of the print request can be instructed to the multifunction peripheral using the print key that can be recognized only by the user who requests the printing. Therefore, a leak of information associated with pull print can be further prevented.

Note that the print key is not limited to a five-digit number, and other digit number, an alphabetic character, or an alphanumeric character may be used.

[3] Modification

Up to now, the present invention has been described specifically through the embodiments. However, the technical scope of the present invention is not limited to the above-described embodiments. For example, the following are modifications.

(1) Although it is not especially mentioned in the above-described embodiments, the following process may be performed when determining the multifunction peripheral to which the personal computer transmits the print request, for example.

In detail, when a printer driver of the personal computer is activated, the printer driver investigates whether the multifunction peripheral is connected to a network in a range that has been set in advance. For example, the printer driver checks with all IP addresses in the range whether the multifunction peripherals can execute the print request. Then, the printer driver displays the multifunction peripheral, from which a reply indicating that the multifunction peripheral can execute the print request is obtained, in a "printer" area of a display screen.

In this case, the printer driver may obtain not only whether the multifunction peripheral can execute the print request but also more detailed information of the multifunction peripheral, such as a name, an installed function, and the like.

(2) Although the case in which a user selects a print request and instructs the execution of the print request in the multifunction peripheral is described in the above-described embodiments, the present invention is not limited to this construction, and may have the following construction.

In other words, only the instruction of the execution is received in the multifunction peripheral, without causing a user to select a print request. Then, when receiving the instruction of the execution, all of the print requests relating to the user may be executed. If a user requests printing, it can be considered to be normal that the execution is immediately instructed. Therefore, if the above-mentioned construction is used, the user can save trouble of selecting all of the print requests each time.

Also, when requesting printing by mistake, a personal computer that requests the printing may transmit a notification indicating that the print request is to be canceled, to the multifunction peripheral in order to cancel the print request.

Moreover, the multifunction peripheral may receive cancellation of the print request. In this case, if any of the multifunction peripherals receives the cancellation of the print request, the multifunction peripheral may directly notify other multifunction peripheral that the cancellation of the print request is received, or the multifunction peripheral may notify the personal computer that made the print request that the cancellation of the print request is received, and cause the personal computer to notify the other multifunction peripheral of the notification.

Furthermore, after receiving the print request in the multifunction peripheral, the print request may be automatically deleted from the multifunction peripheral, if a predetermined period (such as one day, one week, one month, and the like) has passed. If a user forgets to instruct the execution of the print request, or if the multifunction peripheral cannot receive the completion notification because of trouble of a network, the print request remains in the multifunction peripheral, and a storage area is wastefully consumed. However, with the above-mentioned construction, such waste of the storage area can be prevented.

Note that the predetermined period for which the multifunction peripheral waits to delete the print request may be set by an administrator in accordance with a size of the storage area for each of the multifunction peripherals. Also, the predetermined period may be set by a user when making the print request. However, from a viewpoint of preservation of confidentiality, it is desirable to shorten the predetermined period as much as possible.

(3) Although the case in which the print request of the image data is executed is mainly described in the above-described embodiments, the present invention is not limited to this construction, and may have the following construction. In detail, a user requests any of transfer of image data, Box storage, and server upload to the multifunction peripherals from the personal computer, and instructs any of the multifunction peripherals to execute the request.

Note that the Box storage of the image data means that the image data is stored in a storage area which is called Box that is assigned to each of users in the multifunction peripheral. Also, the server upload of the image data means that the multifunction peripheral transfers the image data to a sever and causes a storage area of the server to store the image data.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. An image processing system including a terminal that makes a request to process image data, and a plurality of image processing devices that process the image data in accordance with the request to process the image data from the terminal, the terminal comprising:
a holder that holds the image data;
a process instruction receiver operable to receive, from a user, an instruction to process the image data held by the holder;
a process requestor operable to transmit, to each of the plurality of image processing devices, the request to process the image data, which includes user specification information and image data specification information, the user specification information specifying the user that transmitted the instruction to process the image data, and the image data specification information specifying the image data relating to the instruction to process the image data, the request to process the image data being free of the image data specified by the image data specification information; and
an image data transmitter operable to, when a request to transmit the image data, which includes the image data specification information, is received from one of the plurality of image processing devices, transmit the image data to the image processing device, wherein the transmission of the image data is separate from the transmission of the request to process the image data which includes the user specification information and the image data specification information, and each of the plurality of image processing devices comprising:
a receiver operable to receive the request to process the image data from the terminal;
an authenticator operable to authenticate a user of the image processing device, wherein the process requestor of the terminal transmits the request to process the image data to the image processing device before the authenticator of the image processing device authenticates the user of the image processing device;
an execution instruction receiver operable to, when the user authenticated by the authenticator is identical to the user specified by the user specification information relating to the request to process the image data, receive an instruction to execute the request to process the image data;
an image data requestor operable to, when the execution instruction receiver receives the instruction to execute the request to process the image data, make the request to transmit the image data from the terminal;
an image processor operable to receive, from the terminal, the image data requested by the image data requestor to perform image processing on the image data; and
a completion notifier operable to, when the image processing by the image processor is completed, transmit a completion notification to the terminal, the completion notification specifying the request to process the image data;

the terminal further comprising a transferring part operable to, when the completion notification is received from one of the image processing devices having completed the image processing on the image data, transfer the completion notification at least to other image processing devices, different from the one image processing device having completed the image processing on the image data, which have received the request to process the image data from the terminal; and each of the plurality of image processing devices further comprising a deleting part operable to, when the completion notification is received from the terminal, delete the request to process the image data specified by the completion notification, the request to process the image data being previously received from the terminal.

2. The image processing system of claim 1, wherein
each of the plurality of image processing devices further comprises:
a displaying part operable to display, to the user authenticated by the authenticator, a list of one or more requests to process the image data, which include the user specification information that specifies the user, wherein
the image processing device receives, from the user, a selection of any of the one or more requests to execute the selected request.

3. The image processing system of claim 1, wherein
the image processing is any of print, transfer, Box storage, and server upload.

4. The image processing system of claim 1, wherein the execution instruction receiver receives, from a user, the instruction to execute the request to process the image data.

5. An image processing system including a terminal that makes a request to process image data, and a plurality of image processing devices that process the image data in accordance with the request to process the image data from the terminal,
the terminal comprising:
a holder that holds the image data;
a process instruction receiver operable to receive, from a user, an instruction to process the image data held by the holder;
a process requestor operable to transmit, to each of the plurality of image processing devices, the request to process the image data, which includes user specification information and image data specification information, the user specification information specifying the user that transmitted the instruction to process the image data, and the image data specification information specifying the image data relating to the instruction to process the image data, the request to process the image data being free of the image data specified by the image data specification information; and
an image data transmitter operable to, when a request to transmit the image data, which includes the image data specification information, is received from one of the plurality of image processing devices, transmit the image data to the image processing device after the process requestor has transmitted the request to process the image data including the user specification information and the image data specification information, and
each of the plurality of image processing devices comprising:
a receiver operable to receive the request to process the image data from the terminal;
an authenticator operable to authenticate a user of the image processing device, wherein the process requestor of the terminal transmits the request to process the image data to the image processing device before the authenticator of the image processing device authenticates the user of the image processing device;
an execution instruction receiver operable to, when the user authenticated by the authenticator is identical to the user specified by the user specification information relating to the request to process the image data, receive an instruction to execute the request to process the image data;
an image data requestor operable to, when the execution instruction receiver receives the instruction to execute the request to process the image data, make the request to transmit the image data from the terminal;
an image processor operable to receive, from the terminal, the image data requested by the image data requestor to perform image processing on the image data; and
a completion notifier operable to, when the image processing by the image processor is completed, transmit a completion notification to the terminal, the completion notification specifying the request to process the image data;
the terminal further comprising a transferring part operable to, when the completion notification is received from one of the image processing devices having completed the image processing on the image data, transfer the completion notification at least to other image processing devices, different from the one image processing device having completed the image processing on the image data, which have received the request to process the image data from the terminal; and
each of the plurality of image processing devices further comprising a deleting part operable to, when the completion notification is received from the terminal, delete the request to process the image data specified by the completion notification, the request to process the image data being previously received from the terminal.

6. The image processing system of claim 5, wherein
each of the plurality of image processing devices further comprises:
a displaying part operable to display, to the user authenticated by the authenticator, a list of one or more requests to process the image data, which include the user specification information that specifies the user, wherein the image processing device receives, from the user, a selection of any of the one or more requests to execute the selected request.

7. The image processing system of claim 5, wherein
the image processing is any of print, transfer, Box storage, and server upload.

8. The image processing system of claim 5, wherein the execution instruction receiver receives, from a user, the instruction to execute the request to process the image data.

9. An image processing method for use with a terminal and a plurality of image processing devices, the method comprising:
receiving, with the terminal, an instruction from a user to process image data held by the terminal;
transmitting, with the terminal, to each of the plurality of image processing devices, a request to process image data including user specification information and image data specification information, the user specification information specifying the user that transmitted the instruction to process the image data, and the image data specification information specifying the image data relating to the instruction to process the image data, the request to process image data being free of the image data specified by the image data specification information;
transmitting, with the terminal, when a request to transmit the image data, which includes the image data specification information, is received from one of the plurality of image processing devices, the image data to the image processing device after the transmission of the request to process the image data;
receiving, with the one of the plurality of the image processing devices, the request to process the image data from the terminal;
authenticating, with the one of the plurality of the image processing devices, a user of the image processing device, wherein the terminal transmits the request to process the image data before the image processing device authenticates the user of the image processing device;
receiving, with the one of the plurality of the image processing devices, when the user authenticated by the authenticator is identical to the user specified by the user specification information relating to the request to process the image data, an instruction to execute the request to process the image data;
making, with the one of the plurality of the image processing devices, when the instruction to execute the request to process the image data is received, the request to transmit the image data from the terminal;

receiving, with the one of the plurality of the image processing devices, the image data requested from the terminal to perform image processing on the image data;

transmitting, with the one of the plurality of image processing devices, a completion notification to the terminal when the image processing is complete, the completion notification specifying the request to process the image data;

transferring, with the terminal when the completion notification is received from the one of the plurality of image processing devices, the completion notification to at least other of the plurality of image processing devices, different from the one of the plurality of image processing devices, which have received the request to process the image data from the terminal; and deleting, with the other of the plurality of image processing devices when the completion notification is received, the request to process the image data specified by the completion notification, the request to process the image data being previously received from the terminal.

10. The image processing method of claim 9 further comprising displaying, with the one of the plurality of the image processing devices, to the user authenticated by the authenticator, a list of one or more requests to process the image data, which include the user specification information that specifies the user, wherein the image processing device receives, from the user, a selection of any of the one or more requests to execute the selected request.

11. The image processing method of claim 9 wherein the image processing is any of print, transfer, Box storage, and server upload.

12. The image processing method of claim 9 wherein the instruction to execute the request to process the image data is received from a user.

13. The image processing system of claim 1, wherein each of the plurality of image processing devices is operable to automatically execute printing of the image data after authentication of the user so that the user does not have to select a job.

14. The image processing system of claim 5, wherein each of the plurality of image processing devices is operable to automatically execute printing of the image data after authentication of the user so that the user does not have to select a job.

15. The image processing method of claim 9, automatically executing, with the one of the plurality of image processing devices, printing of the image data after authentication of the user so that the user does not have to select a job.

* * * * *